United States Patent
Hoshuyama

(10) Patent No.: US 7,633,537 B2
(45) Date of Patent: Dec. 15, 2009

(54) COLOR IMAGE SENSOR, COLOR FILTER ARRAY AND COLOR IMAGING DEVICE

(75) Inventor: Hideo Hoshuyama, Kawasaki (JP)

(73) Assignee: Nikon Corporation, Tokyo (JP)

(*) Notice: Subject to any disclaimer, the term of this patent is extended or adjusted under 35 U.S.C. 154(b) by 446 days.

(21) Appl. No.: 11/137,322

(22) Filed: May 26, 2005

(65) Prior Publication Data
US 2005/0212934 A1    Sep. 29, 2005

Related U.S. Application Data

(63) Continuation of application No. PCT/JP03/15859, filed on Dec. 11, 2003.

(30) Foreign Application Priority Data
Dec. 18, 2002  (JP) .............................. 2002-366296

(51) Int. Cl.
*H04N 3/14*  (2006.01)
(52) U.S. Cl. .................................. 348/272
(58) Field of Classification Search ................ 348/272, 348/273, 277, 279, 256, 308
See application file for complete search history.

(56) References Cited

U.S. PATENT DOCUMENTS

| | | | |
|---|---|---|---|
| 5,063,439 A | 11/1991 | Tabei | |
| 5,237,185 A * | 8/1993 | Udagawa et al. | 257/204 |
| 5,815,159 A * | 9/1998 | Katayama et al. | 345/600 |
| 7,030,916 B2 * | 4/2006 | Aotsuka | 348/272 |
| 2002/0163583 A1 * | 11/2002 | Jones | 348/272 |

FOREIGN PATENT DOCUMENTS

| | | | |
|---|---|---|---|
| EP | 1255410 | * | 6/2002 |
| EP | 1255410 A2 | | 11/2002 |
| JP | A-10-189930 | | 7/1998 |
| JP | A 2001-016598 | | 1/2001 |
| JP | A 2002-271804 | | 9/2002 |

* cited by examiner

*Primary Examiner*—Jason Chan
*Assistant Examiner*—Joel Fosselman
(74) *Attorney, Agent, or Firm*—Oliff & Berridge, PLC

(57) ABSTRACT

It is an object of the present invention to provide a single board type color image sensor which can suppress the reduction of detection luminance range while enlarging detection color range. The color image sensor of the present invention has pixel blocks arranged in an array state, each pixel block comprising a first pixel detecting red light, a second pixel detecting green light, a third pixel detecting blue light, and a fourth pixel detecting light having a wavelength between the green light and the blue light or between the green light and the red light. Further, sensitivity of the fourth pixel to the above-mentioned light is kept lower than sensitivity of the second pixel to the green light.

12 Claims, 5 Drawing Sheets

(a)

(b)

COLOR IMAGE SENSOR, COLOR FILTER ARRAY AND COLOR IMAGING DEVICE

CROSS-REFERENCE TO RELATED APPLICATION

This application is a continuation of PCT International Patent Application No. PCT/JP03/15859, filed on Dec. 11, 2003, designating the U.S., and claims the benefit of priority from Japanese Patent Application No. 2002-366296, filed on Dec. 18, 2002, the entire contents of which are incorporated herein by reference.

BACKGROUND OF THE INVENTION

1. Field of the Invention

The present invention relates to a color image sensor and a color filter array which are applied to a color imaging unit such as an electronic camera and a video camera, and the color imaging unit.

2. Description of the Related Art

A color image sensor has been conventionally applied to a color imaging unit such as an electronic camera and a video camera.

In general, it is preferable for the color imaging unit to bring spectral sensitivity characteristics of its imaging optical system from a shooting lens to a color image sensor closer to spectral sensitivity characteristics of the eyes of a human being (or color matching functions which are publicly known) as much as possible.

The color image sensor has a G pixel detecting green light, a B pixel detecting blue light, and an R pixel detecting red light, which are arranged in an array state.

Especially, a Bayer matrix has the G pixels arranged in a checkered pattern and the B pixel and R pixel arranged alternately in gaps between the G pixels. That is, one unit (pixel block) is constituted of the four pixels made of the two G pixels, one B pixel, and one R pixel.

Incidentally, the reason why the number of the G pixels is greater than the R pixel and B pixel is as follows.

One of characteristics of the eyes of the human being is that the number of cells detecting green is greater than the number of cells detecting other colors. Accordingly, the eyes of the human being have wide detection luminance range of the green light.

Accordingly, when a large quantity of the G pixels are provided in the image sensor, it is possible to extend the detection luminance range (what is called dynamic range) similarly to the eyes of the human being.

Meanwhile, since color range to be discriminated by the three kinds of pixels, which are the R pixel, G pixel, and B pixel, is slightly narrower than the color range to be discriminated by the eyes of the human being, two different colors for the eyes of the human being are sometimes detected as the same color.

Therefore, a color image sensor of a multiband type in which another type of pixel is further added has been recently proposed (for example, a color image sensor described in Patent Document 1=Japanese Patent Application Laid-Open No. 2002-271804).

According to the color image sensor of the multiband type described in the Patent Document 1, a Y pixel detecting color between green and red (yellow) is added in addition to the R pixel, G pixel, and B pixel, to thereby enlarge detection color range.

However, according to the conventional color image sensor of the multiband type, it is necessary to reduce the number of the G pixels from two to one, in order to add the Y pixel into the pixel block. Therefore, there are tendencies that the detection luminance range of the green light is reduced and the detection luminance range of the color image sensor is reduced.

Incidentally, this problem is not caused when the color image sensor is changed to a multi-board type because the Y pixel can be added without reducing the number of the G pixels, but it is not so suitable for the electronic camera and video camera requiring downsizing, because an arrangement space is increased from the necessity for branching an optical path and arranging the image sensor for each branched path.

Further, this problem is not caused when a rotary switching filter is applied because the Y pixel can be added without reducing the number of the G pixels, but it is not so suitable for the electronic camera and video camera requiring downsizing, because the arrangement space is increased similarly to the case of the multi-board type.

SUMMARY OF THE INVENTION

For this reason, it is an object of the present invention to provide a single board type color image sensor which can suppress the reduction of detection luminance range while enlarging detection color range.

Further, it is an object of the present invention to provide a color filter array which can suppress the reduction of the detection luminance range while enlarging the detection color range, in constituting the single board type color image sensor.

Further, it is an object of the present invention to provide a color imaging unit which can suppress the reduction of the detection luminance range while enlarging the detection color range.

A color image sensor according to the present invention comprises pixel blocks arranged in an array state, comprising a first pixel detecting red light, a second pixel detecting green light, a third pixel detecting blue light, and a fourth pixel detecting light having a wavelength between the green light and the blue light or between the green light and the red light, wherein sensitivity of the fourth pixel to the above-mentioned light is kept lower than sensitivity of the second pixel to the green light.

By combining these four kinds of pixels, the detection color range is enlarged.

Further, when an output of the fourth pixel is referred to in addition to an output of the second pixel, it is possible to detect the high-level green light. Accordingly, the reduction of the detection luminance range can be suppressed while enlarging the detection color range.

Preferably, the sensitivity of the fourth pixel is kept to about half the sensitivity of the second pixel. Thereby, the effect of "enlarging the detection color range" and the effect of "suppressing the reduction of the detection luminance range" can be obtained equally.

Further preferably, a peak wavelength of a sensitivity characteristic of the first pixel is within the range from 590 nm to 640 nm, a peak wavelength of a sensitivity characteristic of the second pixel is within the range from 520 nm to 570 nm, a peak wavelength of a sensitivity characteristic of the third pixel is within the range from 430 nm to 480 nm, and a peak wavelength of a sensitivity characteristic of the fourth pixel is within the range from 490 nm to 530 nm or the range from 560 nm to 640 nm.

A color filter array according to the present invention comprises filter blocks arranged in an array state, comprising a first filter unit limiting incident visible light to red light, a second filter unit limiting the incident visible light to green light, a third filter unit limiting the incident visible light to blue light, and a fourth filter unit limiting the incident visible light to light having a wavelength between the green light and the blue light or between the green light and the red light, wherein transmittance of the fourth filter unit to the above-mentioned light is kept lower than transmittance of the second filter unit to the green light.

According to the color filter array in which these four kinds of filter units are combined, the detection color range of the color image sensor is enlarged. Further, when an output of the pixel opposing the fourth filter unit is referred to in addition to an output of the pixel opposing the second filter unit of the color image sensor, it is possible to detect the high-level green light. Accordingly, when this color filter array is used, the color image sensor which can suppress the reduction of the detection luminance range while enlarging the detection color range is realized.

Preferably, the transmittance of the fourth filter unit is kept to about half the transmittance of the second filter unit. Thereby, the effect of "enlarging the detection color range" and the effect of "suppressing the reduction of the detection luminance range" can be obtained equally.

Further preferably, a peak wavelength of a transmittance characteristic of the first filter unit in a visible light region is within the range from 590 nm to 640 nm, a peak wavelength of a transmittance characteristic of the second filter unit in the visible light region is within the range from 520 nm to 570 nm, a peak wavelength of a transmittance characteristic of the third filter unit in the visible light region is within the range from 430 nm to 480 nm, and a peak wavelength of a transmittance characteristic of the fourth filter unit in the visible light region is within the range from 490 nm to 530 nm or the range from 560 nm to 640 nm.

A color imaging unit according to the present invention comprises the color image sensor of the present invention, and a signal processing unit generating color signals based on respective outputs of the first pixel, the second pixel, and the third pixel, wherein the signal processing unit generates the color signals based on an output of the fourth pixel in addition to the respective outputs when the output of the second pixel does not reach a saturation level, and generates the color signals based on the output of the fourth pixel instead of the output of the second pixel when the output of the second pixel reaches the saturation level.

According to the color imaging unit as above, it is possible to bring out the effects of the color image sensor of the present invention without fail.

A color imaging unit according to the present invention comprises an image sensor in which pixels detecting visible light are arranged in an array state, the color filter array of the present invention, arranged on an incident side of the image sensor, and a signal processing unit generating color signals based on respective outputs of a first pixel, second pixel, and third pixel opposing the first filter unit, the second filter unit, and the third filter unit, out of the pixels of the image sensor, wherein the signal processing unit generates the color signals based on an output of the fourth pixel in addition to the respective outputs when the output of the second pixel does not reach a saturation level, and generates the color signals based on the output of the fourth pixel instead of the output of the second pixel when the output of the second pixel reaches the saturation level.

According to the color imaging unit as above, it is possible to bring out the effects of the color filter array of the present invention without fail.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS (Embodiment)

This embodiment relates to an electronic camera (corresponding to a color imaging unit of the present invention) to which a color image sensor of the present invention or a color filter array of the present invention is applied.

Figure 1:
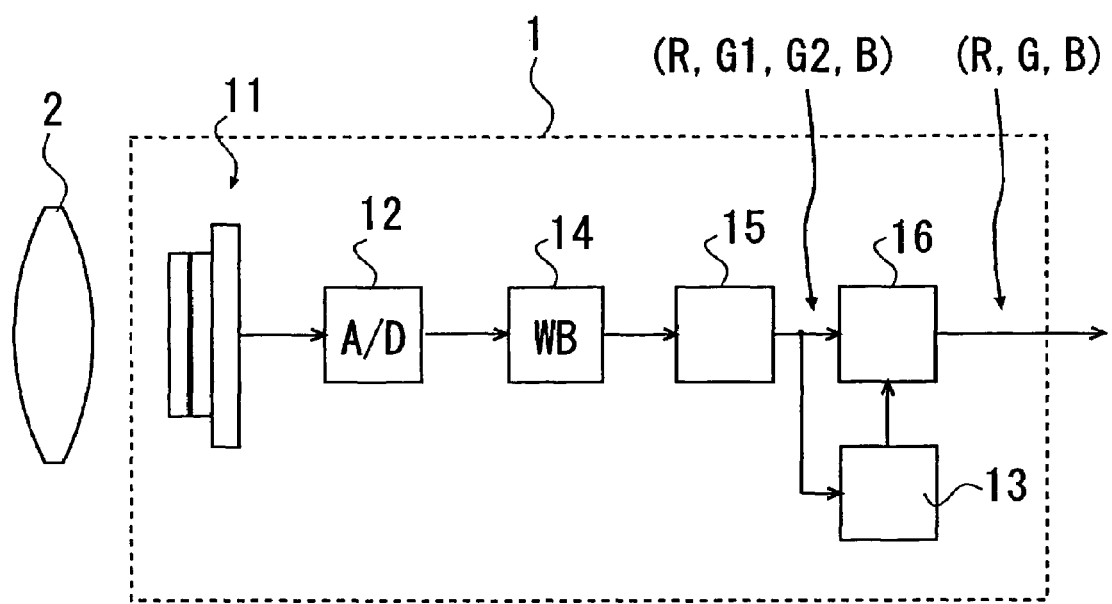
FIG. 1 is a view showing schematic structure of an electronic camera of this embodiment.

FIG. 1 is a view showing schematic structure of the electronic camera of this embodiment.

The electronic camera is constituted of, for example, an electronic camera body 1 and a shooting lens 2.

The electronic camera body 1 is provided with a color image sensor 11, an A/D converter 12, a white balance processing circuit 14, a color interpolation circuit 15, a color transformation circuit 16, a color transformation matrix decision circuit 13 (corresponding to a signal processing unit) and the like.

A subject image by the shooting lens 2 is formed on the color image sensor 11. An output signal from the color image sensor 11 is inputted into the A/D converter 12 via a not-shown analog gain controller, and converted into a digital signal. The digital signal is subjected to white balance processing in the white balance processing circuit 14, color interpolation processing in the interpolation circuit 15, gray-scale transformation processing in the color transformation circuit 16, and then stored in a not-shown memory.

Figure 2:
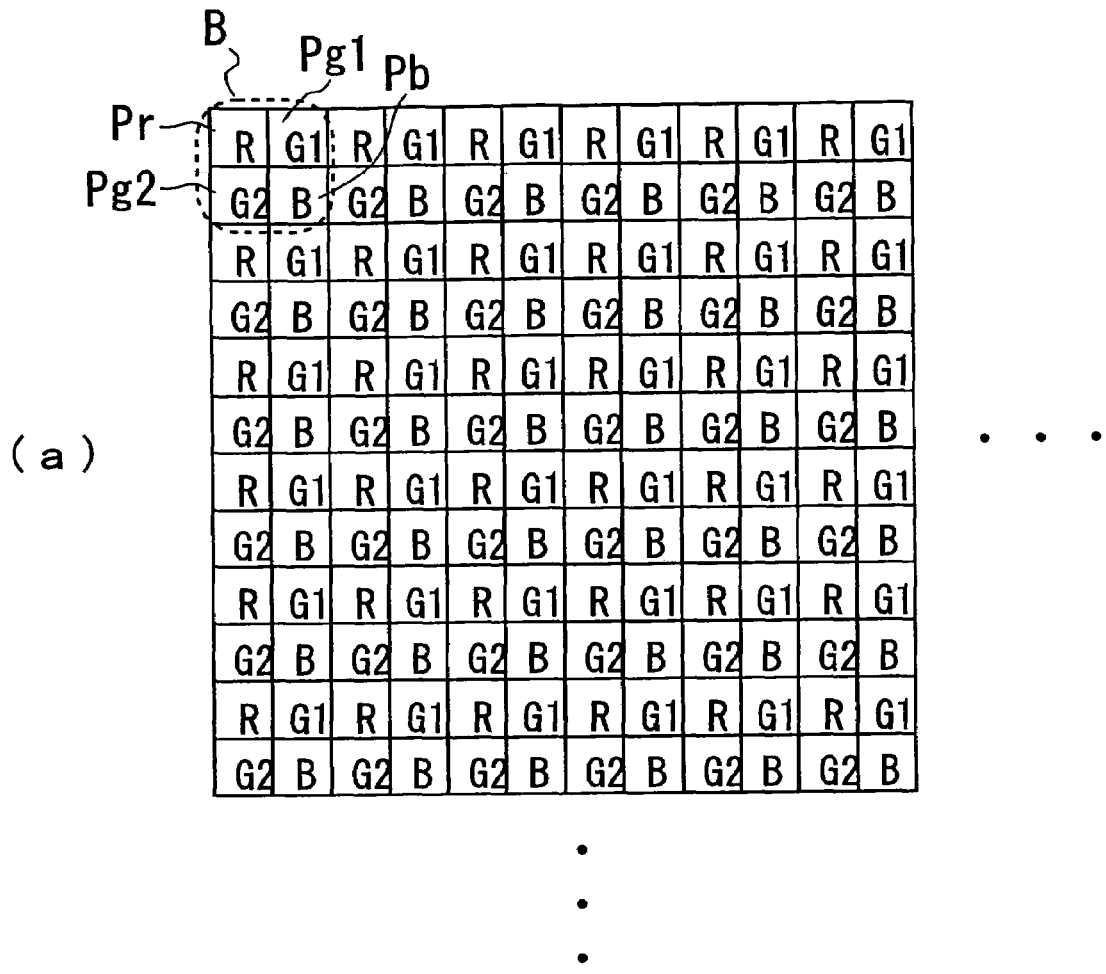
FIG. 2 are views explaining a color image sensor 11 of this embodiment.
Figure 2:
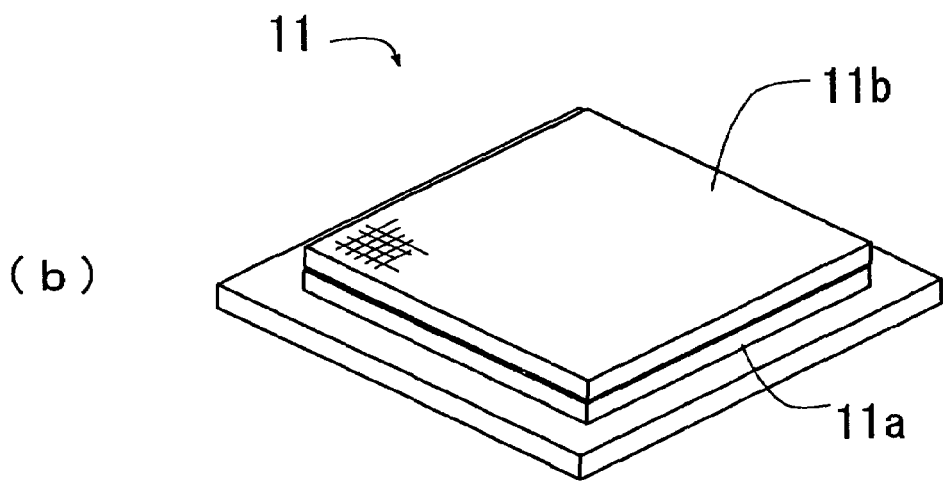

FIG. 2 are views explaining the color image sensor 11 of this embodiment.

FIG. 2(a) is a view explaining respective pixel blocks B and respective pixels P of the color image sensor 11, and FIG. 2(b) is a view showing a structural example of the color image sensor 11.

As shown in FIG. 2(a), the pixel blocks B are arranged in an array state on an imaging surface of the color image sensor 11.

Each pixel block B has an R pixel Pr for detecting red light (corresponding to a first pixel), a G1 pixel Pg1 for detecting green light (corresponding to a second pixel), a B pixel Pb for detecting blue light (corresponding to a third pixel), and a G2 pixel Pg2 for detecting light having a wavelength between the green light and blue light (corresponding to a fourth pixel) which are arranged in a cross shape.

The sensitivity of the G2 pixel Pg2 to the above-mentioned light is set lower than the sensitivity of the G1 pixel Pg1 to the green light.

Incidentally, it is preferable that the G1 pixel Pg1 and the G2 pixel Pg2 are arranged to have the relation unadjacent to each other in each pixel block B (that is, upper right-lower left relation as shown in the drawing, or upper left-lower right relation).

The reason is that, as will be described later, the electronic camera of this embodiment may treat an output of the G1 pixel Pg1 and an output of the G2 pixel Pg2 as the outputs of the pixels of different kinds or the outputs of the pixels of the same kind, and therefore it is preferable that the G1 pixel Pg1 and the G2 pixel Pg2 are arranged alternately and in a checkered pattern on the imaging surface.

The color image sensor 11 like the above is constituted by, for example, preparing an image sensor 11a for capturing a visible light image (which is hereinafter a monochrome image sensor in which characteristics of respective pixels are equal to each other) and arranging a color filter array 11b on the incident side of the image sensor 11a.

The color filter array 11b has filter blocks arranged in an array state, and each of the filter blocks has an R filter unit for limiting the incident visible light to the red light, a G1 filter unit for limiting the incident visible light to green light, a B filter unit for limiting the incident visible light to the blue light, and a G2 filter unit for limiting the incident visible light to the light having the wavelength between the green light and the blue light, being arranged.

Among the above units, the transmittance of the G2 filter unit to the above-mentioned light is set lower than the transmittance of the GI filter unit to the green light.

According to this color filter array 11b, the pixel of the image sensor 11a opposing the R filter unit can be used as the R pixel Pr for detecting the red light, the pixel opposing the G1 filter unit can be used as the G1 pixel Pg1 for detecting the green light, the pixel opposing the B filter unit can be used as the B pixel Pb for detecting the blue light, and the pixel opposing the G2 filter unit can be used as the G2 pixel Pg2 for detecting the light having the wavelength between the green light and the blue light.

Incidentally, it is preferable that the G1 filter unit and the G2 filter unit are arranged to have the relation unadjacent to each other in each filter block (that is, upper right-lower left relation or upper left-lower right relation), in order to arrange the G1 pixel Pg1 and the G2 pixel Pg2 in the checkered pattern.

Figure 3:
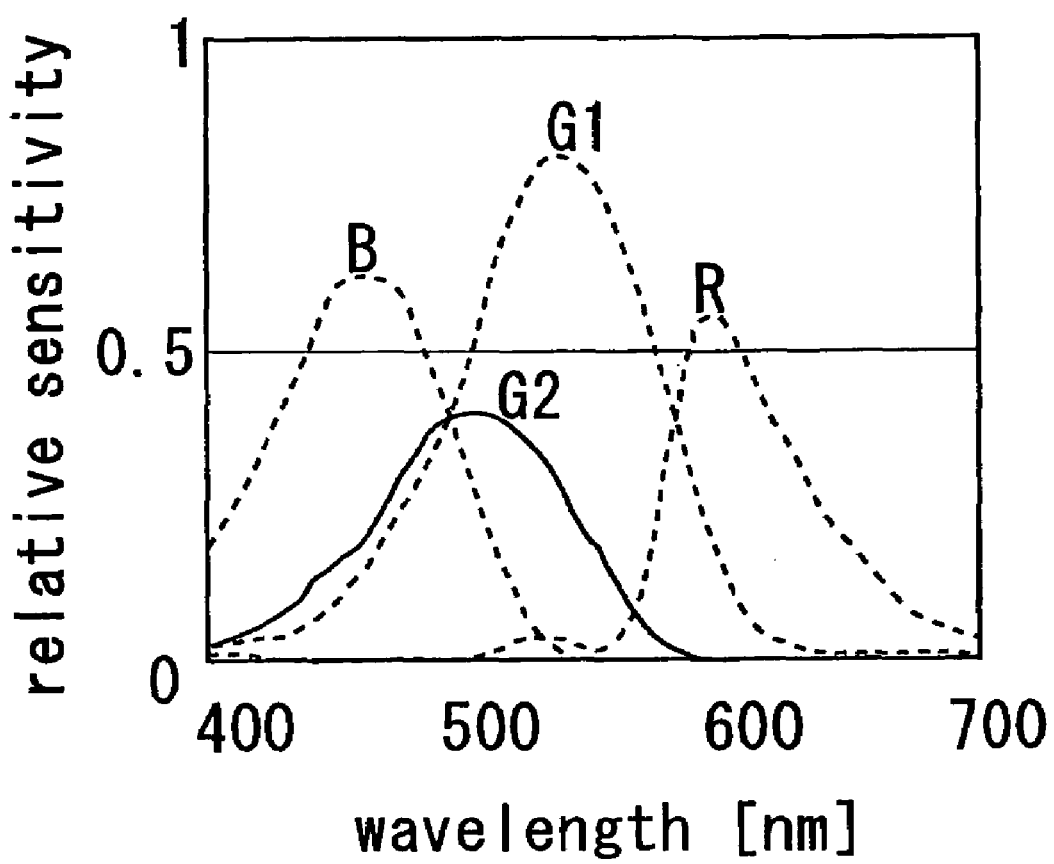
FIG. 3 is a view showing spectral sensitivity characteristics of the color image sensor 11 of this embodiment.

FIG. 3 is a graph showing spectral sensitivity characteristics of the color image sensor 11 of this embodiment.

In FIG. 3, the curve denoted by the symbol "R" corresponds to a sensitivity characteristic curve of the R pixel Pr, the curve denoted by the symbol "G1" corresponds to a sensitivity characteristic curve of the G1 pixel Pg1, the curve denoted by the symbol "B" corresponds to a sensitivity characteristic curve of the B pixel Pb, and the curve denoted by the symbol "G2" corresponds to a sensitivity characteristic curve of the G2 pixel Pg2.

A peak wavelength of the sensitivity characteristic of the R pixel Pr for detecting the red light is within the range from 590 nm to 640 nm, a peak wavelength of the sensitivity characteristic of the G1 pixel Pg1 for detecting the green light is within the range from 520 nm to 570 nm, and a peak wavelength of the sensitivity characteristic of the B pixel Pb for detecting the blue light is within the range from 430 nm to 480 nm.

Further, a peak wavelength of the sensitivity characteristic of the G2 pixel Pg2 for detecting the light between the blue light and the green light is within the range from 490 nm to 530 nm.

For example, the peak wavelength of the sensitivity characteristic of the R pixel Pr is 600 nm, the peak wavelength of the sensitivity characteristic of the G1 pixel Pg1 is 540 nm, the peak wavelength of the sensitivity characteristic of the B pixel Pb is 460 nm, and the peak wavelength of the sensitivity characteristic of the G2 pixel Pg2 is 500 nm.

It should be noted that spectral transmittance characteristics of the color filter array 11b for adding such spectral sensitivity characteristics to the color image sensor 11 are as follows.

A peak wavelength of the transmittance characteristic of the R filter unit of the color filter array 11b is within the range from 590 nm to 640 nm, a peak wavelength of the transmissivity characteristic of the G1 filter unit is within the range from 520 nm to 570 nm, and a peak wavelength of the transmissivity characteristic of the B filter unit is within the range from 430 nm to 480 nm.

Further, a peak wavelength of the transmissivity characteristic of the G2 filter unit is within the range from 490 nm to 530 nm.

For example, the peak wavelength of the transmittance characteristic of the R filter unit is 600 nm, the peak wavelength of the transmittance characteristic of the G1 filter unit is 540 nm, the peak wavelength of the transmittance characteristic of the B filter unit is 460 nm, and the peak wavelength of the transmittance characteristic of the G2 filter unit is 500 nm.

Figure 4:
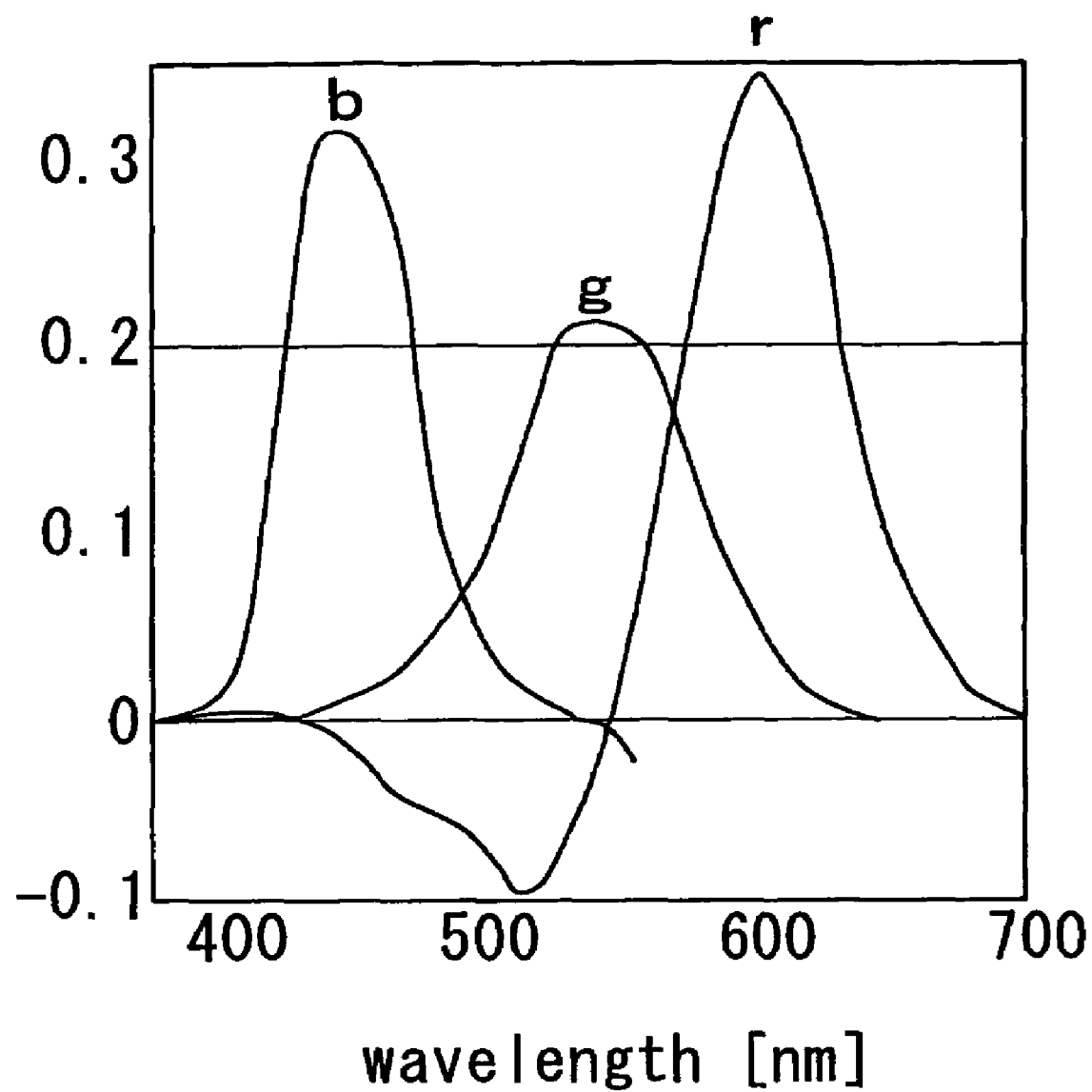
FIG. 4 is a view showing color matching functions (publicly known)

FIG. 4 is a graph showing color matching functions (publicly known).

The symbols "r", "g" and "b" denote the color matching functions in RGB color system r, g and b, respectively.

As is clear from the comparison between FIG. 3 and FIG. 4, the sensitivity characteristic of the R pixel, the sensitivity characteristic of the G1 pixel, and the sensitivity characteristic of the B pixel of this embodiment correspond to the color matching function r, the color matching function g and the color matching function b, respectively.

It should be noted that the color matching function r has not only a positive peak, but also a negative peak.

The sensitivity characteristic of the G2 pixel of this embodiment has its peak at the position corresponding to the negative peak of the color matching function r.

Therefore, color detection in color range which is almost the same as the color range shown by the color matching functions r, g and b (that is, the color range detectable by the eyes of a human being) is possible, based on the output value of the R pixel, the output value of the G1 pixel, the output value of the B pixel, and an opposite sign of the output value of the G2 pixel.

Moreover, as is clear from FIG. 3, the sensitivity of the G2 pixel is positively set lower than the sensitivity of the G1 pixel. For example, it is preferable that the sensitivity of the G2 pixel is about half the sensitivity of the G1 pixel.

By setting as above, a saturation level of the G2 pixel (value showing the upper limit of detectable luminance) becomes higher than a saturation level of the G1 pixel (value showing the upper limit of detectable luminance), and is set approximately twice as high.

Meanwhile, the color interpolation circuit 15 shown in FIG. 1 performs color interpolation based on an output signal R of the R pixel Pr, an output signal G1 of the G1 pixel Pg1, an output signal B of the B pixel Pb, and an output signal G2 of the G2 pixel Pg2 (incidentally, these are the output signals after the A/D conversion and white balance processing), and generates signals (R, G1, G2 and B) showing respective color components of the light incident on each pixel (pixel signals).

Incidentally, the G1 component, G2 component, and B component in the pixel signal of the R pixel in a pixel block B are respectively obtained based on the respective output signals of the G1 pixel, G2 pixel, and B pixel in the surrounding pixel block.

Similarly, the R component, G2 component, and B component in the pixel signal of the G1 pixel in a pixel block B are respectively obtained based on the respective output signals of the R pixel, G2 pixel, and B pixel in the surrounding pixel block.

Similarly, the R component, G1 component, and B component in the pixel signal of the G2 pixel in a pixel block B are respectively obtained based on the respective output signals of the R pixel, G1 pixel, and B pixel in the surrounding pixel block.

Similarly, the R component, G1 component, and G2 component in the pixel signal of the B pixel in a pixel block B are respectively obtained based on the respective output signals of the R pixel, G1 pixel, and G2 pixel in the surrounding pixel block.

Next, the color transformation circuit 16 subjects the pixel signals (R, G1, G2 and B) to the color transformation by multiplying these by a color transformation matrix M of 3×4, as shown in the expression (1), to generate color signals for display (R, G and B).

$$\begin{bmatrix} R \\ G \\ B \end{bmatrix} = M \begin{bmatrix} R \\ G1 \\ G2 \\ B \end{bmatrix} \quad (1)$$

Here, the color transformation matrix M to be multiplied by the color transformation circuit 16 of this embodiment is any one of a matrix A, matrix B, and matrix C. The matrix A, matrix B or matrix C is set selectively by the color transformation matrix decision circuit 13.

In selecting, the color transformation matrix decision circuit 13 refers to the G1 component of the pixel signals (R, G1, G2 and B) and makes a selection based on the value of the G1 component. Further, as a result of the selection, the color transformation matrix decision circuit 13 performs white balance reprocessing if necessary (as will be described later in detail).

The matrixes A, B and C are expressed by the expressions (2), (3) and (4), for example.

$$A = \begin{bmatrix} 0.60 & .066 & -1.25 & 0.31 \\ 0.23 & 1.15 & -0.87 & 0.40 \\ -0.02 & 0.14 & -0.65 & 1.01 \end{bmatrix} \quad (2)$$

$$B = \begin{bmatrix} 0.64 & .044 & -0.63 & 0.18 \\ 0.26 & 1.00 & -0.43 & -0.05 \\ 0.00 & 0.03 & -0.32 & 0.94 \end{bmatrix} \quad (3)$$

$$C = \begin{bmatrix} 0.67 & 0 & 0.23 & 0.06 \\ 0.28 & 0 & 0.85 & -0.14 \\ 0.02 & 0 & -0.09 & 0.88 \end{bmatrix} \quad (4)$$

As is clear from the reference to the expressions (2) and (3), the matrix A or the matrix B reflects the respective components of the pixel signals (R, G1, G2 and B) in the color signals (R, G and B).

Here, as shown in FIG. 3, the peaks of the sensitivity characteristic of the G1 pixel and the sensitivity characteristic of the G2 pixel are close to each other. Therefore, the G1 component and G2 component show a subtle color difference precisely.

Accordingly, the matrix A or matrix B reflects the subtle color difference of the pixel signals (R, G1, G2 and B) in the color signals (R, G and B) precisely.

Incidentally, since the sign of the component in the first line and third column (coefficient of G2) is negative in either the matrix A or the matrix B, the bigger the G2 component of the pixel signals (R, G1, G2 and B), the smaller the R component of the color signals (R, G and B) relatively. Thereby, color reproduction by the color signals (R, G and B) similar to color reproduction by the color matching functions r, g and b (refer to FIG. 3, in which the negative peak is between blue and green) is possible.

Meanwhile, as is clear from the reference to the expression (4), the matrix C regards the G2 component as the signal showing green, instead of the G1 component of the pixel signals (R, G1, G2 and B), and reflects the R component, G2 component, and B component in the color signals (R, G and B).

Here, as mentioned above, the peaks of the sensitivity characteristic of the G1 pixel and the sensitivity characteristic of the G2 pixel are close to each other, and the saturation level of the G2 pixel is higher than the saturation level of the G1 pixel (twice as high).

Accordingly, the G2 component shows the luminance of the color close to the color shown by the G1 component (green) precisely up to the level higher than the G1 component.

Therefore, the matrix C reflects the high level luminance of the pixel signals (R, G1, G2 and B) in the color signals (R, G and B) precisely.

Figure 5:
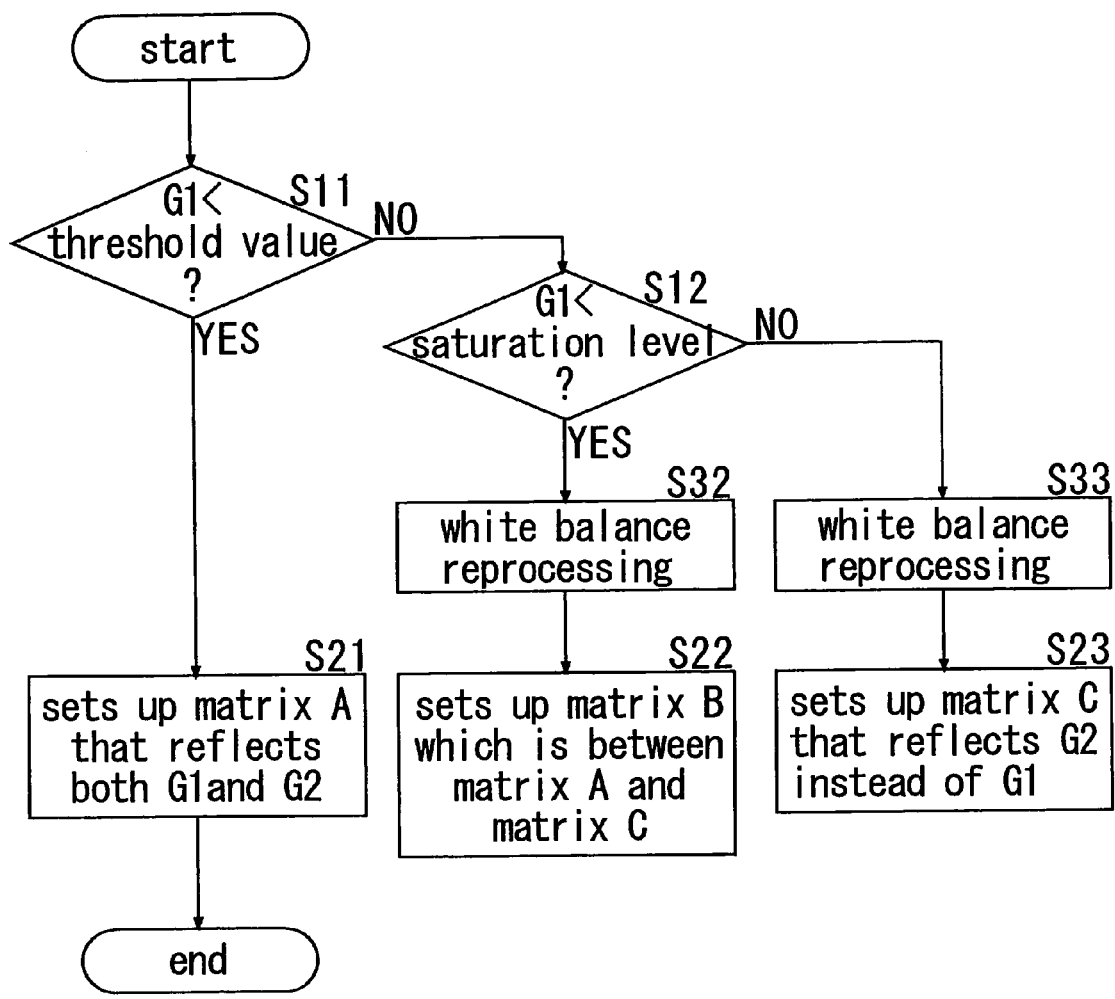
FIG. 5 is a view explaining the procedure of the processing by a color transformation matrix decision circuit 13.

FIG. 5 is a flowchart explaining the procedure of the processing by the color transformation matrix decision circuit 13.

The color transformation matrix decision circuit 13 refers to the G1 component of the pixel signals (R, G1, G2 and B).

Then, when the value of the G1 component does not exceed the saturation level (value corresponding to the saturation level of the output signal of the G1 pixel, which is 3500, for example) (YES in a step S11, or No in a step S11 and YES in a step S12), it selects the matrix A or the matrix B which reflects the subtle color difference precisely (a step S21 or step S22), and when the value of the G1 component exceeds the saturation level (3500, for example) (NO in the step S11 and NO in the step S12), it selects the matrix C which reflects the high level luminance precisely (a step S23).

That is, according to this embodiment, when the G1 component of the pixel signals (R, G1, G2 and B) does not exceed the saturation level of the G1 pixel (YES in the step S11, or NO in the step S11 and YES in the step S12), the detection color range enlarges, and when the value of the G1 component of the pixel signals (R, G1, G2 and B) exceeds the saturation level of the G1 pixel (NO in the step S11 and NO in the step S12), the high luminance can be detected precisely although the detection color range does not enlarge. Therefore, reduction of the detection luminance range can be suppressed while enlarging the detection color range.

Incidentally, when comparing the matrix B and matrix A as shown in the expressions (2) and (3), the absolute values of the coefficients in the second column (coefficients of G1) and the coefficients in the third column (coefficients of G2) of the matrix B are smaller than those of the matrix A as a whole (the matrix B has the smaller reflection amount of the G1 components and the smaller negative reflection amount of the G2 components than the matrix A).

That is, the matrix B performs the color transformation between the matrix A and the matrix C (the reflection amount of the G1 components is 0 and the reflection amount of the G2 components is large).

Accordingly, as shown in FIG. 5, it is preferable that the matrix A is selected (a step S21) when the value of the G1 component is lower than a threshold value (3000, for example) which is smaller than the saturation level (YES in the step S11), and the matrix B is selected (a step S22) when it is higher than the threshold value and lower than the saturation level (NO in the step S11 and YES in the step S12).

Thus, when the three kinds of matrixes, not only the matrix C and matrix A but also the matrix B which is between the two, are used appropriately, it is possible to prevent the color transformation from changing drastically corresponding to the difference in the G1 component, and unnatural expressions from appearing on the reproduced image.

Incidentally, the white balance gain to be multiplied by the respective signals by the white balance processing circuit 14 (refer to FIG. 1) is supposed to be an optimum value when using the matrix A.

In this case, when the matrix B is used and the matrix C is used, it is preferable that the white balance reprocessing is performed before the step S22 and the step S23 are performed (steps S32 and S33).

Incidentally, the white balance gain to be multiplied in the white balance reprocessing in the step S32 is an optimum value when using the matrix B instead of the matrix A, and the white balance gain to be multiplied in the white balance reprocessing in the step S33 is an optimum value when using the matrix C instead of the matrix A.

(Others)

Incidentally, although the sensitivity of the G2 pixel is "half" the sensitivity of the G1 pixel in the above-described embodiment, processing attaching a higher value to "enlargement of the detection color range" than "suppressing the reduction of the detection luminance range" is possible when it is set to be slightly larger than the half, and processing attaching a higher value to "suppressing the reduction of the detection luminance range" than "enlargement of the detection color range" is possible when it is set to be slightly smaller than the half. It is preferable that the relation between the G2 sensitivity and the G1 sensitivity is decided by taking a balance between the two in consideration.

Further, although the detection color of the G2 pixel is the color between blue and green in the above-described embodiment, the same effects as those of the above-described embodiment can be obtained even when it is changed to color between green and red, as long as its sensitivity is set lower than the G1 pixel (preferably about a half). It should be noted that the contents of the color transformation matrixes (values of matrix elements) are changed appropriately according to the sensitivity characteristic of the G2 pixel.

Moreover, although the color image sensor in which the color filter array and the monochrome image sensor are combined is exemplified in the above-described embodiment, it is possible to use a color image sensor which does not use the color filter. Further, when a new color filter array is arranged on a conventional color image sensor (such as a color image sensor having a Bayer matrix and the like), it is also possible to add the spectral sensitivity characteristics similar to those of the color image sensor according to the above-described embodiment.

As described thus far, according to the present invention, a single board type color image sensor which can suppress the reduction of the detection luminance range while enlarging the detection color range is realized.

Further, according to the present invention, the color filter array which can suppress the reduction of the detection luminance range while enlarging the detection color range is realized, when the single board type color image sensor is constituted.

Furthermore, according to the present invention, the color imaging unit which can suppress the reduction of the detection luminance range while enlarging the detection color range is realized.

The invention is not limited to the above embodiments and various modifications may be made without departing from the spirit and scope of the invention. Any improvement may be made in part or all of the components.

What is claimed is:

1. A color imaging device, in which pixel blocks are arranged in an array state, comprising
a signal processing unit generating color signals based on respective outputs of a first pixel, second pixel, and third pixel,
said pixel blocks including:
said first pixel detecting red light;
said second pixel detecting green light;
said third pixel detecting blue light; and
a fourth pixel detecting light having one of wavelengths between the green light and the blue light and between the green light and the red light, wherein
sensitivity of said second pixel is higher than sensitivity of any one of said first pixel, said third pixel, and said fourth pixel, and the sensitivity of said fourth pixel to the light detected is kept lower than the sensitivity of said second pixel to the green light, and
said signal processing unit generates the color signals based on four color components including respective outputs of said first pixel, said second pixel, said third pixel, and said fourth pixel when the output of said second pixel does not reach a saturation level, and generates the color signals based on three color components including respective outputs of said first pixel, said third pixel, and said fourth pixel and excluding the output of said second pixel when the output of said second pixel reaches the saturation level.

2. The color image sensor according to claim 1, wherein the sensitivity of said fourth pixel is kept to about half the sensitivity of said second pixel.

3. The color image sensor according to claim 1, wherein:
a peak wavelength of a sensitivity characteristic of said first pixel is within the range from 590 nm to 640 nm;
a peak wavelength of a sensitivity characteristic of said second pixel is within the range from 520 nm to 570 nm;
a peak wavelength of a sensitivity characteristic of said third pixel is within the range from 430 nm to 480 nm; and
a peak wavelength of a sensitivity characteristic of said fourth pixel is within one of the ranges from 490 nm to 530 nm and from 560 nm to 640 nm.

4. The color image sensor according to claim 2, wherein:
a peak wavelength of a sensitivity characteristic of said first pixel is within the range from 590 nm to 640 nm;
a peak wavelength of a sensitivity characteristic of said second pixel is within the range from 520 nm to 570 nm;
a peak wavelength of a sensitivity characteristic of said third pixel is within the range from 430 nm to 480 nm; and a peak wavelength of a sensitivity characteristic of said fourth pixel is within one of the ranges from 490 nm to 530 nm and from 560 nm to 640 nm.

5. A color imaging device comprising:

a color filter array having filter blocks arranged in an array state, including a first filter unit limiting incident visible light to red light, a second filter unit limiting the incident visible light to green light, a third filter unit limiting the incident visible light to blue light, and a fourth filter unit limiting the incident visible light to light having one of wavelengths between the green light and the blue light and between the green light and the red light;

an image sensor in which pixels detecting visible light are arranged in an array state on an emergent side of said color filter array; and a signal processing unit generating color signals based on respective outputs of a first pixel, second pixel, and third pixel out of the pixels of said image sensor, the first, second, and third pixels each opposing said first filter unit, said second filter unit, and said third filter unit, wherein transmissivity of said second filter unit is higher than transmissivity of any one of said first filter unit, said third filter unit, and said fourth filter unit, and the transmissivity of said fourth filter unit to the light detected is kept lower than the transmissivity of said second filter unit to the green light, and said signal processing unit generates the color signals based on four color components including respective outputs of said first pixel, said second pixel, said third pixel, and said fourth pixel when the output of the second pixel does not reach a saturation level, and generates the color signals based on three color components including respective outputs of said first pixel, said third pixel, and said fourth pixel and excluding the output of said second pixel when the output of the second pixel reaches the saturation level.

6. The color imaging device according to claim 5, wherein the transmissivity of said fourth filter unit is kept to about half the transmissivity of said second filter unit.

7. The color imaging device according to claim 5, wherein:

a peak wavelength of a transmittance characteristic of said first filter unit in a visible light region is within the range from 590 nm to 640 nm;

a peak wavelength of a transmittance characteristic of said second filter unit in the visible light region is within the range from 520 nm to 570 nm;

a peak wavelength of a transmittance characteristic of said third filter unit in the visible light region is within the range from 430 nm to 480 nm; and a peak wavelength of a transmittance characteristic of said fourth filter unit in the visible light region is within one of the ranges from 490 nm to 530 nm and from 560 nm to 640 nm.

8. The color imaging device according to claim 6, wherein:

a peak wavelength of a transmittance characteristic of said first filter unit in a visible light region is within the range from 590 nm to 640 nm;

a peak wavelength of a transmittance characteristic of said second filter unit in the visible light region is within the range from 520 nm to 570 nm;

a peak wavelength of a transmittance characteristic of said third filter unit in the visible light region is within the range from 430 nm to 480 nm; and a peak wavelength of a transmittance characteristic of said fourth filter unit in the visible light region is within one of the ranges from 490 nm to 530 nm and from 560 nm to 640 nm.

9. A signal processing method applied to a color imaging device, in which pixel blocks are arranged in an array state, said signal processing method comprising a signal processing step generating color signals based on respective outputs of a first pixel, second pixel, and third pixel, said pixel blocks including:

said first pixel detecting red light;

said second pixel detecting green light;

said third pixel detecting blue light; and a fourth pixel detecting light having one of wavelengths between the green light and the blue light and between the green light and the red light, said imaging device keeping sensitivity of said second pixel higher than sensitivity of any one of said first pixel, said third pixel, and said fourth pixel, and keeping the sensitivity of said fourth pixel to the light detected lower than the sensitivity of said second pixel to the green light, wherein in said signal processing step, the color signals are generated based on four color components including respective outputs of said first pixel, said second pixel, said third pixel, and said fourth pixel when the output of said second pixel does not reach a saturation level, and the color signals are generated based on three color components including respective outputs of said first pixel, said third pixel, and said fourth pixel and excluding the output of said second pixel when the output of said second pixel reaches the saturation level.

10. The signal processing method according to claim 9, wherein the sensitivity of said fourth pixel is kept to about half the sensitivity of said second pixel.

11. The signal processing method according to claim 9, wherein:

a peak wavelength of a sensitivity characteristic of said first pixel is within the range from 590 nm to 640 nm;

a peak wavelength of a sensitivity characteristic of said second pixel is within the range from 520 nm to 570 nm;

a peak wavelength of a sensitivity characteristic of said third pixel is within the range from 430 nm to 480 nm; and a peak wavelength of a sensitivity characteristic of said fourth pixel is within one of the ranges from 490 nm to 530 nm and from 560 nm to 640 nm.

12. The signal processing method according to claim 10, wherein:

a peak wavelength of a sensitivity characteristic of said first pixel is within the range from 590 nm to 640 nm;

a peak wavelength of a sensitivity characteristic of said second pixel is within the range from 520 nm to 570 nm;

a peak wavelength of a sensitivity characteristic of said third pixel is within the range from 430 nm to 480 nm; and a peak wavelength of a sensitivity characteristic of said fourth pixel is within one of the ranges from 490 nm to 530 nm and from 560 nm to 640 nm.

* * * * *